United States Patent
Hayashi

(10) Patent No.: US 6,470,796 B2
(45) Date of Patent: Oct. 29, 2002

(54) PRESS MACHINE

(75) Inventor: Takao Hayashi, Gifu (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 137 days.

(21) Appl. No.: 09/731,727

(22) Filed: Dec. 8, 2000

(65) Prior Publication Data

US 2001/0013278 A1 Aug. 16, 2001

(30) Foreign Application Priority Data

Feb. 16, 2000 (JP) ........................................ 2000-037564

(51) Int. Cl.⁷ .............................................. B30B 15/26
(52) U.S. Cl. ............................ 100/43; 83/368; 83/370; 83/371; 100/48
(58) Field of Search ................................ 100/4, 43, 50, 100/99, 48; 83/368, 370, 371; 700/206, 301, 90, 159, 160, 167; 701/99; 72/15.3, 18.1, 18.2

(56) References Cited

U.S. PATENT DOCUMENTS 5,483,874 A * 1/1996 Shimizu et al. ............... 100/50
5,491,647 A * 2/1996 O'Brien et al. ............ 100/97 X
5,706,711 A * 1/1998 Ito ............................ 83/368 X

FOREIGN PATENT DOCUMENTS

| JP | 06-246374 | 9/1994 |
|----|-----------|--------|
| JP | 07-246431 | 9/1995 |
| JP | 10-286637 | 10/1998 |

* cited by examiner

Primary Examiner—W. Donald Bray
(74) Attorney, Agent, or Firm—Armstrong, Westerman & Hattori, LLP

(57) ABSTRACT

A plurality of detecting means 37, 38, 39, 40 are installed to detect a plurality of type specifying factors of work sheets W. A work sheet type identifying means 41 is installed to identify the types of the work sheets based on the factors detected by the detecting means 37~40. A parameter selection means 42 is installed to select control parameters in accordance with the work sheet type identified by the work sheet type identifying means 41. A process control means 32 controls a processing means 3 based on the control parameters thus selected. The parameter selection means 42 is composed of a parameter memory means 44 and a parameter selection section 43. Said control parameters include a speed pattern of the ram, a hover height of the ram, a press torque in form-processing, and a number of tons for punching.

3 Claims, 5 Drawing Sheets

FIG. 5

| WORK SHEET TYPE | | | | CONTROL PARAMETER | | | | |
|---|---|---|---|---|---|---|---|---|
| THICK-NESS | VARI-ATION | MATERIAL | SURFACE PROTEC-TION | SPEED PATTERN | HOVER HEIGHT | FORMING TORQUE | PUNCHING TON NUMBER |
| -- | -- | -- | -- | -- | -- | -- | -- |
| -- | -- | -- | -- | -- | -- | -- | -- |
| -- | -- | -- | -- | -- | -- | -- | -- |
| -- | -- | -- | -- | -- | -- | -- | -- |

PARAMETER MEMORY MEANS

44

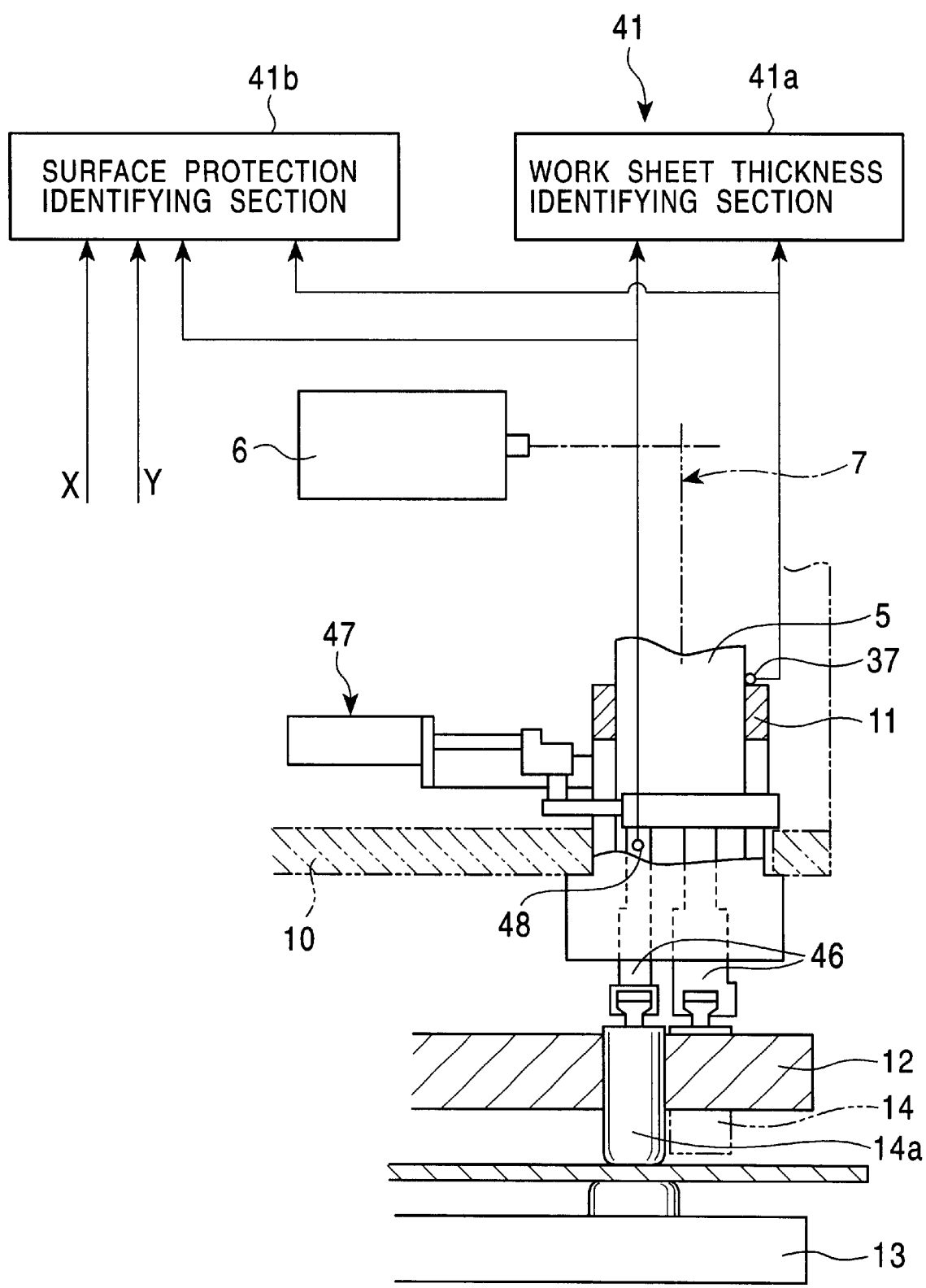

PRESS MACHINE

FIELD OF THE INVENTION

The present invention relates to a press machine to process work sheets of a wide range of material and thickness.

BACKGROUND OF THE INVENTION

Press-processing including punching deals with work sheets of various thickness and material. A servo-motor-driven punch press or a hydraulic machine is capable of controlling various parameters, including ram speed curves, hover heights, and punching ton numbers. To insure high-quality processing, these parameters need to be set when necessary.

Conventionally, in an effort to automate the setting of these parameters, commands called "MAT" have been prepared in a processing program in respect to the thickness and the material of the work sheets, so that control parameters are chosen automatically during the execution process by NC devices.

However, describing commands for specifying the work sheet thickness and material in a processing program may place additional burden on programming process. In addition, although it is preferable to vary the hover height of the ram depending on the thickness of the work sheets, it is not possible to write in a processing program to reflect these partial variations in surface height that exist in work sheets, which are likely to occur due to bending or the like.

Further, although work sheets may have protection coating such as a coating sheet or other types of coating, the types of coating vary to such a large extent that it is too burdensome to make a program if commands corresponding to each coating are written in a process program.

It is thus an object of the present invention to provide a press machine that can evaluate and identify the types of the work sheets mechanically, and further apply suitable processing in accordance with the types of the work sheets.

Another object of the present invention is to make it easier to choose control parameters.

Still another object of the present invention is to realize optimum processing.

SUMMARY OF THE INVENTION

A press machine of the present invention is composed of a processing means 3 for pressing a work sheet W; a plurality of detecting means 37~40 for detecting work sheet type specifying factors on the press machine; a work sheet type identifying means 41 for identifying the type of the work sheet W based on the factors detected by the detecting means 37~40; a control parameter selection means 42 for selecting control parameters based on the type identified by said work sheet type identifying means 41; and a process control means 32 for controlling the processing by said processing means 3 based on the control parameters that have been selected by the control parameter selection means 42. Said work sheet type specifying factors include work sheet thickness, variations in the surface height of a work sheet, material, existence of surface protection and types thereof, and other factors except for the size of the whole sheet or the shape of the whole sheet.

When a work sheet W is delivered to the press machine, the detecting means 37~40 detect a plurality of work sheet type W specifying factors. The work sheet type identifying means 41 identifies the type of the work sheet W based on the detected factors. The parameter selection means 42 selects control parameters in accordance with the type identified. The process control means 32 control the processing of the processing means 3 based on the parameters thus selected. In this way, the type of work sheet W is detected, identified on the machine, and appropriate control parameters are automatically selected. As a result, highly automated processing is made possible. In this case, the identification of work sheet W is done after detecting various factors, so that the identification of the work sheet W is done appropriately, and various types of work sheets W depending on various purposes can be identified, and high quality processing in accordance with the types of work sheets W is made possible.

In the present invention, said parameter selection means 42 is composed of a parameter memory means 44, in which types of work sheets W and control parameters are stored so that the elements of the latter are linked with the ones of the former; and a parameter selection section 43 which selects appropriate control parameters from said parameter memory means 44 based on the type of the work sheet identified by said work sheet type identifying means 41.

In this way, determining control parameters is made easy by devising a separate parameter memory means 44, which stores types of work sheets W and control parameters with elements of the latter related to the elements of the former.

In the present invention, if said processing means 3 is a punch processing means driven by a ram 5, said control parameters may include at least one of the following parameters: the speed pattern of said ram 5, the hover height of said ram 5, the press torque of said ram 5 in form processing, and the number of tons to specify the strength for punching in punching operation.

These parameters including the speed pattern, the hover height, the ram press torque in forming operation, and the number of punching tons, influence the quality and efficiency of processing. Automatic selection of said parameters by means of the parameter selection means 42 ensures optimum processing.

BRIEF DESCRIPTION OF THE DRAWING

FIG. 5 is a block diagram illustrating the concept of a parameter memory means thereof.

FIG. 6 is a diagram illustrating the concept of another example of a press machine embodying the present invention.

DETAILED DESCRIPTION OF THE PREFERRED EMBODIMENTS

Figure 1:
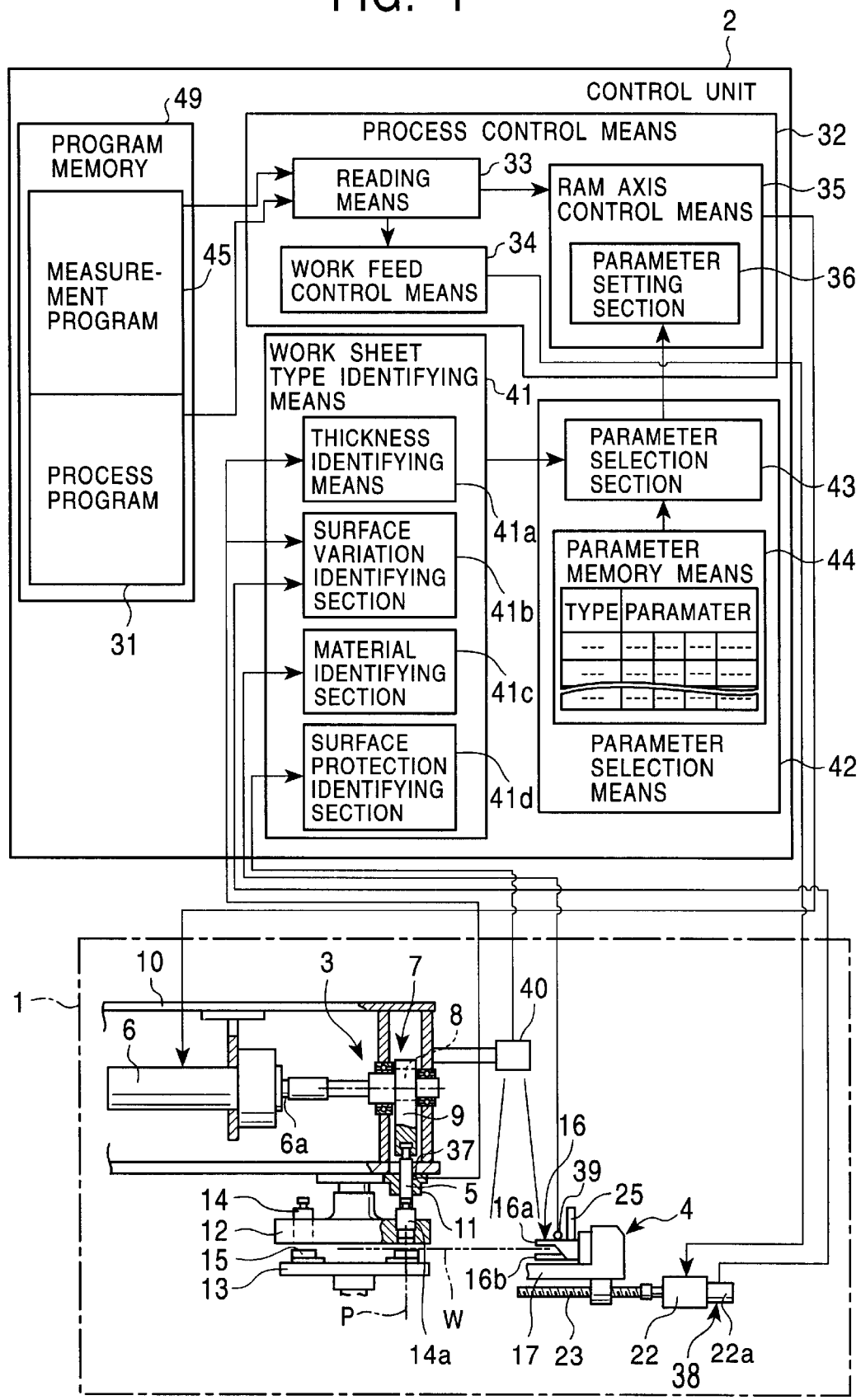
FIG. 1 is an illustrative diagram of the concepts of an example of a press machine embodying the present invention.

The preferred embodiments of the present invention will now be explained in detail with reference to the accompanying drawings.

A press machine according to the present invention can be used in a punch press and is composed of a machine main body 1 and a control unit 2.

The machine main body 1 is composed of a processing means 3 to press a work sheet W and a work feed means 4 to transfer the work sheet W to a processing position P for being processed by the processing means 3. The processing means 3 utilizes the vertical drive of a ram 5 to execute punching. The ram 5 is driven by a servo motor 6, and the rotational output of the motor shaft 6*a* is transferred through a motion converter device 7 that converts rotational movement to linear movement. The motion converter 7 is composed of an eccentric cam mechanism in which an eccentric cam directly connected to the motor shaft 6*a* moves a crank arm 9 vertically. The ram 5 is linked with a pin to the lower end of the crank arm 9. The ram 5 is guided to move vertically along the ram guide 11 mounted on the frame 10. The frame 10 has a pair of tool holders 12, 13, one for punch tools 14 and the other for die tools 15. The tool holders 12, 13 are turrets with a plurality of the punch tools 14 and the die tools 15 arranged in a circle along the circumferences thereof.

Figure 2:
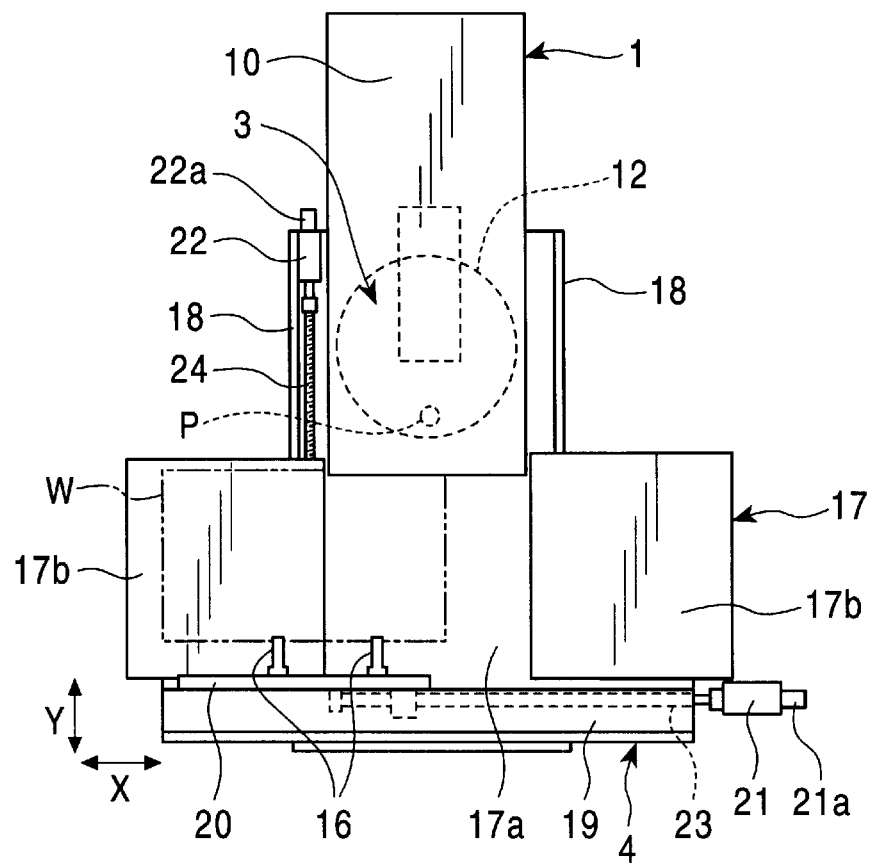
FIG. 2 is a horizontal view of the press machine of FIG. 1.
Figure 3:
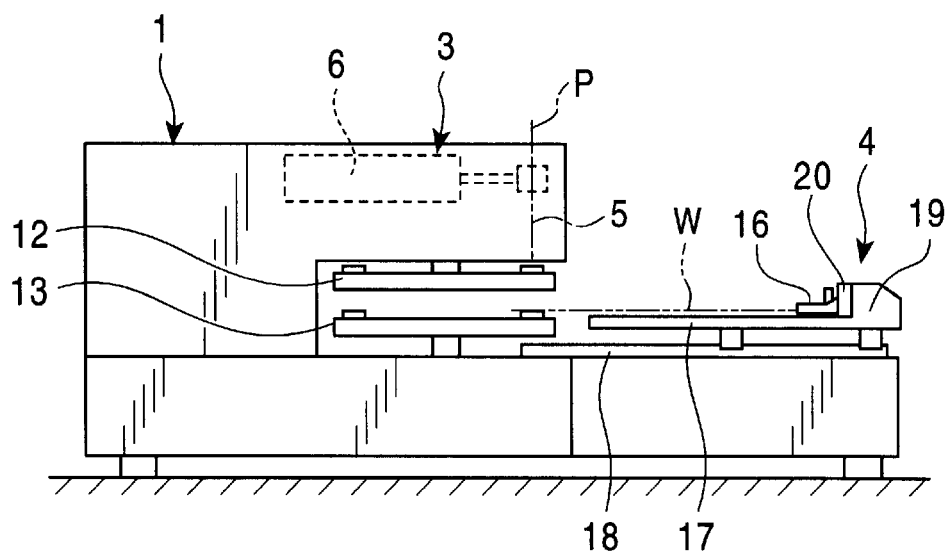
FIG. 3 is a side view of the press machine of FIG. 1.

The work feed means 4 moves the work sheet W, the edge of which is held by work holders 16, forward and backward (in Y direction) and right and left (in X direction) on a table 17, as is shown in FIG. 2 and FIG. 3. The table 17 is composed of a fixed table 17*a* and a movable table 17*b*. The work feed means 4 is composed of a carriage 19 which moves forward and backward (in Y direction) along rails 18 formed on the frame 10 together with the movable table 17*a*, and a cross slide 20 that is movable right and left (in X direction) and is mounted on the carriage 19. The cross slide 20 has a plurality of work holders 16. The carriage 19 and the cross slide 20 are driven by respective servo motors 21, 22 via ball screws 23, 24. The work holder 16 has an upper jaw 16*a* and a lower jaw 16*b* to clamp the work sheet W, as is shown in FIG. 1. It also has an open-close driving means 25 such as a cylinder, to open and close the upper jaw 16*a* and the lower jaw 16*b*.

The control unit 2 is a program-controlled system and comprises a numerical control system and a sequence control system. The control unit 2 has a process control means 32 to read a process program 31 and to execute the program to control the machine main body 1. The process control means 32 is composed of a work feed control means 34 to control the servo motors 21, 22 that drive the movement of the work feed means 4 in both X and Y directions, ram axis control means 35 to control a ram shaft servo motor 6 that drives the ram shaft, a reading means 33 that reads each command of the process program 31 and relays the commands to each of the corresponding axis control means 34, 35 and to a sequence control means(not shown in the drawings). The ram axis control means 35 also has a parameter setting section 36 to execute controls according to the parameters set in the parameter setting section 36. The process program 31 is written in NC codes or the like.

The press machine embodying the present invention has incorporated on the machine main body 1 a plurality of detecting means 37~40, each detecting respectively a plurality of work sheet type specifying factors of the work sheet W. In addition, the control unit 2 has a work sheet type identifying means 41 to identify the types of the work sheet W based on the factors detected by the detecting means 37~40, and a parameter selection means 42 to select control parameters based on the types of the work sheet W identified by the work sheet type identifying means 41. Moreover, there is a parameter setting section 36 in which the parameters are set, processes of which will be described later. A program memory 49 is provided with a measurement program 45 to make the machine main body 1 execute operations required to detect type specifying factors of work sheets W. Said measurement program 45 is executed by the process control means 32 just as is the process program 31. Said work sheet type identifying means 41 comprises a work sheet thickness identifying section 41*a*, a surface variation identifying section 41*b*, a material identifying section 41*c* and a surface protection identifying section 41*d*. These identifying sections 41*a*~41*d* identify, respectively, thickness, surface topography, material, and surface coating of the work sheet W to identify the types of the work sheet W.

A first detecting means 37 detects the thickness of the work sheet W and is composed of a linear sensor used for detecting the stroke position of the ram 5. The values detected by the first detecting means 37 are input into the work sheet thickness identifying section 41*a*. In terms of the sheet thickness measurement, a pressure measurement tool 14*a*, which is mounted in addition to the punch tools 14 at the tool station on the tool holder 12, is pressed against the surface of the work sheet W. The press measurement tool 14*a* is pressed against the surface of the work sheet W with the drive of the ram 5 by means of the measurement program 45. The work sheet identifying section 41*a* identifies the work sheet thickness based on the output value of the linear sensor as the first detecting means 37, the value obtained when the pressure measurement tool 14*a* is pressed against the work sheet W. Identification of the sheet thickness may be done by allocating the values into a multiplicity of predetermined value brackets. Or else, the measured values may be stored in a memory as such.

The work sheet thickness detecting means 37 does not have to be a sensor for detecting the position of the ram 5, but can be anything within the machine that can detect the work sheet thickness. For example, a sensor to detect the degree of opening of the work holder 16 when the work holder 16 holds the work sheet W can serve as the work sheet thickness detecting means 37.

A second detecting means 38 detects surface variations and detects the surface positions at each section of the work sheet W. The surface variation detecting means 38 is composed of said work sheet thickness detecting means 37 and position detectors 21*a* and 22*a* mounted on the servo motors 21, 22 that drive respectively each of the two axes of the work feed means 4.

The measurement of surface variations are done by pressing the pressure measurement tool 14a driven by the ram 5 at several positions of the work sheet W, which is moved by said work feed means 4. The surface variation identifying section 41*b* of the work sheet type identifying means 41 stores the values detected by the work sheet thickness detecting mans 37 measured at each position related to the coordinates acquired by the position detectors 21*a*, 22*a*.

The surface variation identifying section 41*b* may either be a means to identify a surface position as such even though the work sheet W is bent, or one to identify the thickness of each point of the work sheet W. If it is the one to identify the surface position as in natural state, the timing when the work sheet thickness detecting means 37 records the output can be set to be the same as the timing of output sent by a pressure-sensing element (not shown in the drawings) mounted on the ram 5, which senses the pressure the instance the pressure measurement tool 14*a* touches the work sheet W.

A third detecting means 39 detects the material of the work sheet W. For example, it determines whether the work sheet W is made of metal or resin, or further in detail whether it is aluminum or steel. The mechanism used for the material detecting means 39 may be any of the group of mechanisms comprising a mechanism to apply electricity to the work sheet W and measure the electrical resistance, a mechanism that measures capacitance (measures charges), or a mechanism that measures the ballistic wave frequency the work sheet W emits after being knocked. The third detecting means 39 may be placed on the work holder 16. It is especially preferable to put it on the work holder 16 when the employed measuring mechanism is the one for measuring the electrical resistance, or for measuring the capacitance.

The material identifying section 41*c* of the work sheet type identifying means 41 identifies the material of the work sheet W by comparing the measured values such as electrical resistance, capacitance, or frequency with the set standard values.

A fourth detecting means 40 detects the surface protection of the work sheet W. A charge coupled device camera (CCD camera), or a detector to measure capacitance (charge) may be used as the surface protection detecting means 40.

The surface protection identifying section 41*d* of the work sheet type identifying means 41 identifies the types of the surface protection (such as sheet or coating) or the existence of such protection by utilizing the information detected by the surface protection detecting means 40. If a CCD camera is used as the surface protection detecting means 40, the color of the work sheet W can specify the surface protection. If the surface protection detecting means 40 uses capacitance as the measurement, it is preferable to use the material identifying means (the third detecting means) 39 employing a mechanism different from the one utilizing the capacitance.

The parameter selection means 42 is composed of a parameter memory means 44 that stores types of work sheet W and corresponding control parameters, and a parameter selection section 43 that selects control parameters stored in the parameter memory means 44 based on the types of the work sheet W determined by the work sheet type identifying means 41. The parameter selection section 43 sets the selected parameters on the parameter setting section 36 of the ram axis control means 35.

Figure 4:
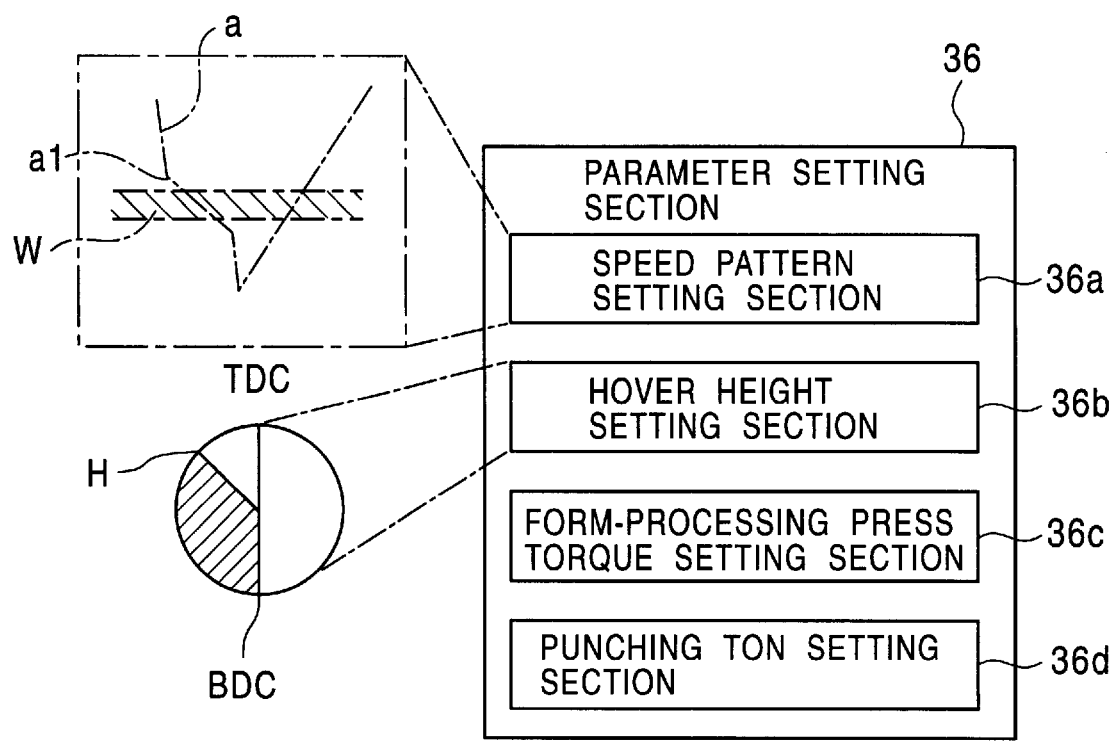
FIG. 4 is a block diagram illustrating the concept of a parameter setting section thereof.

The parameter setting section 36, as shown in FIG. 4, is composed of a speed pattern setting section 36*a*, a hover height setting section 36*b*, a form-processing press torque setting section 36*c* and a punching ton setting section 36*d*. The speed pattern setting section 36*a* sets a speed pattern in which the ram 5 is vertically moved as a parameter used in a servo control system of the ram axis control means 35. For example, the ram 5 is moved, in punching operation, in accordance with a speed curve (a) in which the falling speed of the ram 5 is slowed a short time before the punch tool touches the sheet, and then speeded up soon afterward. The cycle time of the ram can be shortened by lowering the position (al) of the speed curve (a), where the speed-down before touching is executed, to as low a position as possible depending on the sheet thickness and the surface position of the particular part of the work sheet W. This kind of speed curve (a) is set as a speed pattern.

In the hover height setting section 36*b* is set the hover height of the ram 5, which is the position the ram 5 is waiting at the upper position (H). The cycle time can be shortened by putting the hover height of the ram 5 as low as possible as long as it is not causing stripping errors, instead of setting it at the top dead center (TDC). When the motion converter mechanism 7 with an eccentric cam is used as shown in FIG. 1, driving the servo motor 6 in reverse directions can make the hover height (H) lower than the TDC, as shown in the section marked by oblique lines in FIG. 4. This is the way the hover height (H) is set in the hover height setting section 36*b*.

The form-processing press torque setting section 36*c* sets the maximum torque applied to the ram 5 in form-processing as a control parameter. In other words, it is a means for limiting the torque of the servo motor 6 in form-processing, and is used when a torque control means is employed in the servo control system. Avoiding too much pressure in form-processing in punch operation in accordance with the material and work sheet thickness is required to maintain good quality of form-processing. The maximum value of the torque is set in the form-processing press torque setting section 36*c* in this way.

The punching ton number setting section 36*d* sets the number in terms of ton to regulate an output by the servo motor 6 in punching operation. The number of tons for punching is controlled by controlling the electrical currents applied to the servo motor 6.

As is shown in FIG. 5, the parameter memory means 44 stores items that specify the types of the work sheet (for example, the work sheet thickness, surface variations, material and surface protection) and the relationship with the control parameters (for example, the speed pattern, hover height, form-processing press torque and punching ton number) in the form of a table.

Some of the items specifying the types of the work sheet type affect the control parameters and some don't. Some of the items have interactive effects. The relationships between these various factors and the control parameters are arranged into the parameter memory means 44.

For example, among the work sheet type specifying factors, the work sheet thickness and the surface variation both have an impact on the speed pattern, the hover height, the punching ton number, and the form-processing press torque of the control parameters.

The material of the work sheet W also has an impact on the speed pattern, the hover height, the punching ton number, and the form-processing press torque.

The operation of the above-mentioned structure will now be explained. The work sheet W is delivered to the machine main body 1, and then, the work sheet thickness, surface variation, material and surface protection are detected respectively by the detecting means 37 to 40, which are controlled by the measurement program 45, and further identified by each of the identifying means 41*a*~41*d* of the work sheet type identifying means 41. The work sheet type specifying factors identified by the work sheet type identifying means 41 are input into the parameter selection section 43 of the parameter selection means 42. The parameter selection means 42 checks each of the input work sheet type specifying factors against the parameter memory means 44, selects every suitable parameter (such as the speed pattern, the hover height, the form-processing press torque and the number of tons for punching) and sets the parameters in the parameter setting section 36 of the ram axis control means 35.

In this way, after the control parameters have been automatically set, the process program 31 is executed, and the punching operation is done. During the punching operation, the ram axis is controlled according to the control parameters set at the parameter setting section 36.

The measurement by said measurement program 45 can be done by each work sheet W or by every lot change of the work sheets W.

FIG. 6 shows a modified example of a work sheet thickness measurement. This example has a plurality of the punch tools 14 at the same indexed position (the same turret indexed angle) of the tool holder 12. The ram 5 has at its tip a plurality of strikers 46 and a striker selection means 47. The pressing force generated by the fall of the ram 5 only works on a selected striker 46. As a result, only the targeted punch tool 14 is selected for processing use even though there are a plurality of punch tools 14 at the same indexed position.

A load meter 48 is installed for each of all the strikers 46 or for some of the all strikers 46 in a system employing a plurality of the strikers 46. The work sheet thickness identifying section 41a identifies the thickness of the work sheet W based on the detected value of the ram stroke position detected by the detecting means 37, which is a linear sensor when the load meter 48 is on.

Other items in FIG. 6 are similar to the embodiment shown in FIG. 1~FIG. 5.

Each of the embodiments described above has a work sheet thickness detecting means 37, a surface variation detecting means 38, a material detecting means 39 and a surface protection detecting means 40. However, employing any two or three of the above-mentioned detecting means 37 to 40 may be possible. For example of the pair, a combination of work sheet thickness detecting means 37 and a surface variation means 38, work sheet thickness detecting means 37 and material detecting means 39, work sheet thickness detecting means 37 and surface protection detecting means 40, or material detecting means 39 and surface protection detecting means 40 may be employed. As examples of combinations of three selected detecting means, a combination of work sheet thickness detecting means 37, surface variation detecting means 38, and material detecting means 39; a combination of work sheet thickness detecting means 37, surface variation detecting means 38, and surface protection detecting means 40; or a combination of surface variation detecting means 38, material detecting means 39 and surface protection detecting means 40 may be possible. The work sheet type identifying means 41 in these examples employs only the identifying sections that correspond to the chosen detecting means 37~40 out of the four work sheet type identifying sections 41a~41d.

The press machine of the present invention is composed of a processing means that presses work sheets; a plurality of detecting means installed on the machine, which detect a plurality of work sheet type specifying factors; work sheet type identifying means that identify the type of work sheets based on the factors detected by these detecting means; a parameter selection means that selects control parameters based on the type of the work sheet identified by the work sheet type identifying means; and a control means that controls the processing of said processing means based on the control parameters selected by the parameter selection means. As a result, the machine is capable of detecting and identifying the types of work sheets on the machine and performing appropriate automatic process in accordance with the types of the work sheets.

Selection of control parameters is easy if a parameter selection means is composed of a parameter memory means which stores control parameters related to types of work sheets and a parameter selection section which selects control parameters from said parameter memory means based on the types of work sheets identified by said work sheet type identifying means.

When said processing means is a punching processing means which is driven by the vertical movement of a ram, appropriate processing requires at least one of such control parameters as the speed pattern of the ram, the hover height of the ram, the press torque of the ram in form-processing, and the number of punching tons of the ram.

What is claimed is:

1. A press machine comprising; a processing means for press-processing a work sheet; a plurality of detecting means which detect a plurality of work sheet type specifying factors; a work sheet type identifying means which identifies the type of the work sheet based on the factors detected by said detecting means; a parameter selection means which selects control parameters based on the work sheet type identified by said identifying means; and a process control means which controls the processing by said processing means based on the selected control parameters.

2. A press machine according to claim 1, wherein said parameter selection means is composed of a parameter memory means which stores control parameters related to work sheet types; and a parameter selection section which selects control parameters from said parameter memory means in accordance with the work sheet type identified by said work sheet type identifying means.

3. A press machine according to claim 1 or claim 2, wherein said processing means is a punch processing means driven by the vertical movement of a ram; and wherein said control parameters include at least one of the following parameters: a speed pattern of said ram; a hover height of said ram; pressing torque of said ram in form-processing; and a number for punching tons in punching operation.

* * * * *